(12) United States Patent
Rahlves

(10) Patent No.: US 10,705,498 B2
(45) Date of Patent: Jul. 7, 2020

(54) METHOD AND DEVICE FOR MONITORING DATA PROCESSING AND TRANSMISSION IN A SECURITY CHAIN OF A SECURITY SYSTEM

(71) Applicant: Phoenix Contact GmbH & Co. KG, Blomberg (DE)

(72) Inventor: Lutz Rahlves, Tündern (DE)

(73) Assignee: Phoenix Contact GmbH & Co. KG, Blomberg (DE)

( * ) Notice: Subject to any disclaimer, the term of this patent is extended or adjusted under 35 U.S.C. 154(b) by 139 days.

(21) Appl. No.: 16/077,027

(22) PCT Filed: Feb. 3, 2017

(86) PCT No.: PCT/EP2017/052406
§ 371 (c)(1),
(2) Date: Aug. 9, 2018

(87) PCT Pub. No.: WO2017/137326
PCT Pub. Date: Aug. 17, 2017

(65) Prior Publication Data
US 2019/0033810 A1   Jan. 31, 2019

(30) Foreign Application Priority Data

Feb. 10, 2016   (DE) .................. 10 2016 102 282

(51) Int. Cl.
*G06F 11/00* (2006.01)
*G05B 19/048* (2006.01)
(Continued)

(52) U.S. Cl.
CPC .............. *G05B 19/048* (2013.01); *G05B 9/02* (2013.01); *G05B 19/0425* (2013.01);
(Continued)

(58) Field of Classification Search
CPC .............. G05B 19/048; G05B 19/0425; G05B 19/0406; G05B 19/0423; G05B 19/0428;
(Continued)

(56) References Cited

U.S. PATENT DOCUMENTS 7,809,449 B2 * 10/2010 Esch ..................... H04L 12/462
370/352
8,335,573 B2 * 12/2012 Buettner ............ G05B 19/0428
700/19
(Continued)

FOREIGN PATENT DOCUMENTS

DE   102004061334 A1   7/2006
DE   102008044018 A1   5/2010
(Continued)

OTHER PUBLICATIONS

Authorized Officer Nora Lindner, International Preliminary Report on Patentability (IPRP) and English Translation issued in International Application No. PCT/EP2017/052406 dated Aug. 23, 2018.
(Continued)

*Primary Examiner* — Anthony J Amoroso
(74) *Attorney, Agent, or Firm* — Kaplan Breyer Schwarz, LLP

(57) ABSTRACT

A method for monitoring data processing and data transmission in a safety chain of a safety system, and a device for carrying out the method, which achieve the object of further simplifying the monitoring of the safety chain of an overall safety function of a modular safety system, in particular during ongoing operation. For this purpose, the method and device use at least one actual characteristic value for a safety-relevant characterizing attribute of the data processing and/or data transmission.

8 Claims, 1 Drawing Sheet

(51) Int. Cl.
*G05B 9/02* (2006.01)
*G05B 19/042* (2006.01)
*G06F 11/07* (2006.01)
*G06F 11/30* (2006.01)
*G06F 11/34* (2006.01)

(52) U.S. Cl.
CPC ...... *G06F 11/0709* (2013.01); *G06F 11/0745* (2013.01); *G06F 11/0781* (2013.01); *G06F 11/3075* (2013.01); *G06F 11/3476* (2013.01); *G05B 2219/24008* (2013.01); *G05B 2219/25314* (2013.01)

(58) Field of Classification Search
CPC ............... G05B 19/045; G05B 9/02; G05B 2219/24008; G05B 2219/25314; G05B 2219/25315; G06F 11/0709; G06F 11/0745; G06F 11/0781; G06F 11/3075; G06F 11/3476; G06F 11/0703; G06F 11/3072; G06F 11/3466
See application file for complete search history.

(56) References Cited

U.S. PATENT DOCUMENTS

| | | | | |
|---|---|---|---|---|
| 2002/0010874 A1* | 1/2002 | Barthel | ............... | G06F 11/10 714/4.1 |
| 2004/0186927 A1* | 9/2004 | Eryurek | ............... | G05B 15/02 710/12 |
| 2004/0230323 A1* | 11/2004 | Glanzer | ............... | G05B 9/02 700/18 |
| 2005/0027379 A1 | 2/2005 | Dyk et al. | | |
| 2006/0229737 A1* | 10/2006 | Esch | ............... | H04L 12/462 700/1 |
| 2007/0006025 A1 | 1/2007 | Onozuka et al. | | |
| 2007/0124115 A1* | 5/2007 | Buttner | ............... | G05B 19/0428 702/186 |

FOREIGN PATENT DOCUMENTS

| | | |
|---|---|---|
| DE | 102012224044 A1 | 6/2014 |
| DE | 102014213245 A1 | 1/2016 |
| DE | 102015103740 A1 | 9/2016 |
| DE | 102015108359 A1 | 12/2016 |
| EP | 0235201 B1 | 9/1987 |
| EP | 1918869 A1 | 5/2008 |
| EP | 2359201 B1 | 8/2011 |
| EP | 2492771 A2 | 8/2012 |
| JP | H07162425 A | 6/1995 |
| JP | 2006066982 A | 3/2006 |

OTHER PUBLICATIONS

Authorized Officer: Rakoczy, Tobias, International Search Report and Written Opinion issued in PCT application No. PCT/EP2017/052406, dated Apr. 3, 2017.

\* cited by examiner

METHOD AND DEVICE FOR MONITORING DATA PROCESSING AND TRANSMISSION IN A SECURITY CHAIN OF A SECURITY SYSTEM

FIELD

The present invention relates to a method for monitoring data processing and data transmission in a safety chain (also known as a safety loop, even if the chain does not or need not form a loop) of a safety system, and also relates to a device for carrying out the method. The safety system provides an overall safety function and is composed in a modular manner of at least two subsystem modules, and at least the two subsystem modules are connected to a data transfer channel and each provide a partial safety function and are configured for functionally safe data processing and/or data transmission.

BACKGROUND

In order to reduce risks to humans or the environment in automated processes, machines, and installations, safety functions have to be implemented, such as the shutdown of a machine when an emergency stop button has been pressed, or the transition of the system into a safe state after an error has been detected. For this purpose, failsafe automation systems are increasingly being used in automated processes, machines, and installations. Such fail-safe automation systems generally implement the actual safety function (such as emergency stop, two-hand control, mode selector switch, etc.) on the one hand, and on the other hand also fault-detecting and fault-controlling measures according to mechanisms defined in standards (IEC 61508, ISO 13849, . . . ) corresponding to the state of the art.

In the context of the invention as well as in the description and the claims, the terms "safe/safety" refer to functional safety, unless otherwise stated, to be distinguished from secure/security which relates to the protection of technical information processing against unauthorized data manipulation or data leakage).

International standard IEC 61508 and the substantially identical European standard EN 61508 describe functionally safe electrical, electronic, and programmable electronic systems, also with regard to their development. The requirements defined therein with respect to the development process of safe systems lead to significantly higher costs and an increased development budget compared to the development of standard systems. Also, the requirements increase with increasing Safety Integrity Level (SIL; SIL1 to SIL4). The term "safety integrity level" (or safety requirement level) defines a specific degree, corresponding to the respective level, for the required or achieved effectiveness of safety functions for risk reduction. If no safety-directed (also referred to as safety-related or safety-relevant) requirements apply, the development is to be carried out in accordance with the normal standards of operational quality management. Beyond that, the safety integrity level SIL1 imposes the lowest requirements. The higher the safety integrity level, the higher the safety requirements.

Functional safety according to standard IEC 61508 includes, for example, the use of various methods for managing errors, such as the avoidance of systematic errors in the development, the monitoring during ongoing operation in order to detect random errors, and/or the safe managing of detected errors and transition to a state that has been predefined as safe. All these measures may be part of specific previously defined safety functions. Generally, it can be stated that two- or multi-channel systems in which each channel alone can trigger a safety function are able to achieve a higher SIL with less technical effort than systems which have only one channel. Here, channel refers to the information flow through a safety chain (also known as safety loop, even if the chain does not or need not form a loop), for example starting with the request of a safety function (e.g. by a sensor, proximity detector, light barrier, or pushbutton), ending with the actuator which initiates the safe state of a machine.

So, if it is ensured by appropriate measures that an electrical, electronic, and/or programmable system, but also a single subsystem module and also a single hardware and/or software component effectively fulfills a certain safety function, this system or the respective subsystem module is considered as safe or safety-related in the context of the following description and the claims. A system that is adapted to fulfil certain safety functions and which comprises a plurality of subsystem modules, i.e. at least two or more than two subsystem modules each of which in turn are adapted to fulfill safety functions (partial safety functions) is considered as a safety system within the context of the present invention.

Present-day machines and installations employ communication systems (or data transmission systems), such as Ethernet-based networks or fieldbuses to connect distributed I/O devices (input/output devices such as sensors or actuators) and controllers, depending on the size of the installations and the degree of automation. For transmitting safety-relevant data, safety communication protocols (or data transfer protocols, or network protocols) are generally used. Safety communication protocols are nowadays standardized, e.g. in IEC 61784-3, where different safety profiles are described based on principles of safe network communication. All of these network protocols must be able to manage the different error models, e.g. falsification, loss, delay, swap etc. of data and/or telegrams.

The effectiveness of the risk-minimizing technical measures in machines and/or installations must be demonstrated and logged or documented during commissioning of a machine or installation by an overall safety validation. In this case, all safety functions have to be validated for their effectiveness before transitioning into the operating phase of the machine or installation. Although this is still manageable for a complete and non-altered machine or installation, it is becoming increasingly cumbersome and complex in modular machines or installations which are becoming increasingly common.

If, moreover, a plurality of machines and/or installations are used within a system, which furthermore have to implement safety functions cooperatively, they form subsystem modules of the system in the context of the invention, which then forms one or more safety system(s) composed of the plurality of these subsystem modules. In this case, the effectiveness of the risk-minimizing technical measures must be demonstrated by an overall safety validation of the safety system encompassing the involved subsystem modules. To give an example of such a safety system, a punching system is mentioned, which is composed of a feeding machine, a punching machine, and an ejection machine, all three of which have to implement specific safety functions, and also the punching system as a whole has to implement certain safety functions as a safety system to be considered, that means in the interaction of the individual subsystem modules (i.e. in the example the feeding machine, punching machine, and the ejection machine). Thus, such a safety system in the context of the invention usually comprises a plurality of fail-safe automation systems arranged in different subsystem modules within a system, i.e. an overall system, but interact within the system and form a safety system encompassing the involved subsystem modules.

However, an overall safety validation of the safety system encompassing the involved subsystem modules does not only have to take place during the first commissioning. This also applies to any change in the configuration of a modular safety system, a modular installation or machine. For each configuration it is necessary to recalculate and document the parameters, make new error considerations, perform error calculations and validation steps to prove the safety category (safety levels) required for the system or machine, e.g. SIL4, for example when replacing a single module or else as a result of aging processes within individual modules. Therefore, the safety-relevant parameters of the individual modules must be functionally combined according to their interaction. These parameters are typically documented in device specifications and must be up-to-date at the time of the calculation. The relevant safety standards and rules obligate machine manufacturers to specify the safety-relevant parameters, such as failure rates, diagnostic coverage, safe failure fraction, or response times for individual modules. For the calculation of the safety-relevant parameters, offline software tools are used nowadays, such as, e.g., SISTEMA (SIcherheit von STEuerungen an MAschinen; engl.: safety of controls on machines) by the Institute for Occupational safety of the German Social Accident Insurance (IFA).

Furthermore, the functionality and effectiveness of the technical risk-minimizing measures has to be tested in defined time intervals during operation of the safety system or the safe installation or machine.

However, at least up to now, current safety standards such as, e.g., IEC 61508, EN 13849, IEC 62061 do only partially take account for the modularization of machines, installations, or safety systems, and for dynamic modifications in configuration or adaptive combinations of previously unknown safety modules.

Furthermore, the present time is dominated by cyber-physical systems (CPS), the distribution of intelligences, and the Internet of Things (IoT). Industry 4.0 refers to the advent of Internet technologies in automation technology. The complete networking of smart devices from sensor/actuator to control is a prerequisite for modularization, reuse, and adaptability of machine and installation modules. Production operations can then be further optimized and manufacturing in batch size 1 will be possible, for example. The integration and use of cloud services allows predictive diagnostics, for example. All of these trends and technologies in turn contribute to the increasing complexity of modular installations, machines, and safety systems, and to the increased complexity in the overall safety validation.

It will be understood that this required and increasingly higher complexity for the overall safety validation does not meet the flexibility requirements of manufacturers and operators of modular safety systems, installations, and machines.

In this regard, EP 2 359 201 proposes a method for determining a safety level in an automation network comprising a plurality of safety-relevant subscribers, which comprises the steps of: automatic ascertainment of the data-oriented and flow-oriented links between the subscribers of the automation network by a configuration capture module; automatic ascertainment of the subscriber-specific safety characteristic data by a characteristic data capture module; and computation of the safety level in the automation network using a computation code that connects the ascertained data-oriented and flow-oriented links between the subscribers in the automation network and the ascertained subscriber-specific safety characteristic data. The configuration capture module and the characteristic data capture module are part of a central safety manager that accesses the components involved in a safety function, online, via a network.

In addition, in a previous application DE 10 2015 108 359, the present applicant proposes a method for automatic validation of safety functions on a modular safety system, with a central validation device also referred to as a safety validator being connected to the safety system. The method includes, inter alia, the steps of: transferring the local module-specific safety-relevant actual characteristic values from the individual subsystem modules to the validation device; automatically processing the read-out local module-specific safety-relevant actual characteristic values to obtain overall safety-relevant actual characteristic values resulting from the interaction of the individual subsystem modules, by this validation device; automatically comparing the resulting overall safety-relevant actual characteristic values with the nominal characteristic values of the system stored in the memory of the validation device, specifically by the validation device; and automatically generating a reaction signal depending on the result of the comparison. Thus, the so-called safety validator checks online changing safety-related parameters of decentralized partial safety functions, during commissioning and ongoing operation, combines these parameters, monitors the adherence to preconfigured limits and, if the latter are exceeded, can cause transition of the system into a safe state.

Furthermore, in a previous application DE 10 2015 103 740, the present applicant proposes a method for processing and transmitting data within a functionally safe electrical, electronic, or programmable electronic system which is composed of at least two subsystems, each of which complies with a specific safety level. The method comprises the steps of: processing data using the safe hardware and/or software component of a first one of the sub-systems to obtain functionally safe data of a first safety level, and adding to these data at least one indication attribute indicating suitability of these data for use of this first safety level; transmitting these data including the added indication attribute to a second one of these subsystems; and checking the received indication attribute by the second subsystem using the safety hardware and/or software component thereof to determine whether the safety level indicated by said indication attribute is equal to or different from the safety level the second subsystem is complying with; and if the check reveals non-equal safety levels, further processing the data in functionally safe manner based on the lower safety level.

Both EP 2 359 201 and DE 10 2015 108 359 provide a central instance in the form of a safety manager or a validation device. However, this may lead to a limitation in flexibility and manageability, especially with regard to the monitoring of the safety chain of an overall safety function of a modular safety system during ongoing operation. Moreover, additional hardware complexity is required.

SUMMARY

An essential object of the present invention, therefore, is to further simplify the monitoring of the safety chain of an overall safety function of a modular safety system, in particular during ongoing operation.

More particularly, an object is to enable such simplified monitoring without the use of a central additional monitoring entity.

In addition, such simplified monitoring should also be made possible in particular in the case of dynamic modular safety systems and/or modular safety systems that are undergoing changes in their configuration.

As a solution, the invention proposes a method with the features of independent claim 1 and a device with the features of independent claim 7. Advantageous embodiments of the invention are specified in the respective dependent claims, and the stated features and advantages may substantially apply both to the method and to the device.

Accordingly, a method is proposed for monitoring data processing and data transmission in at least one safety chain of a safety system, wherein the safety system provides an overall safety function and is composed, in a modular manner, of at least two subsystem modules, and wherein at least the two subsystem modules are connected to a data transfer channel and each provide a partial safety function and are configured for functionally safe data processing and/or data transmission. The inventive method comprises the steps of:
  processing data by a first one of the subsystem modules to obtain functionally safe data;
  determining, by the first subsystem module, a first actual characteristic value for a safety-relevant characterizing attribute of the data processing and/or transmission, in particular for a total response time;
  transmitting the functionally safe data and the first actual characteristic value from the first subsystem module to a second one of the subsystem modules, and receiving the functionally safe data and the first actual characteristic value by the second subsystem module;
  determining, by the second subsystem module, a second actual characteristic value for the safety-relevant characterizing attribute;
  processing, by the second subsystem module, the first actual characteristic value and the second actual characteristic value so as to obtain a third actual characteristic value for the safety-relevant characterizing attribute;
  determining, by the second subsystem module, a nominal characteristic value for the safety-relevant characterizing attribute;
  comparing the third actual characteristic value with the nominal characteristic value of the safety-relevant characterizing attribute, by the second subsystem module, and, depending on the comparison result,
    if the result of the comparison is positive, further processing and/or forwarding the functionally safe data; or
    if the result of the comparison is negative, triggering a predefined safety reaction.

It should be noted that the term "data transfer channel" does not necessarily require the presence of a bus system. Also within the scope of the invention are subsystem modules, e.g. modular machines, with modules for data transmission that are not interlinked via bus systems. One possible alternative within the scope of the term "data transfer channel" are, for example, subsystem modules in which the "data transfer channel" to which they are connected is composed of respective internal interconnected backplane buses. Thus, the subsystem modules may, for example, also be modular devices having an internal backplane bus.

Particularly preferably it is contemplated that the data processing and data transmission in the safety chain of the safety system is performed cyclically, and that the steps of the method are performed cyclically.

Furthermore, a device is proposed for carrying out the method, comprising a safe hardware and/or software component configured for functionally safe data processing and/or data transmission. The inventive device is distinguished by the fact that the safe hardware and/or software component is adapted
  to process data to obtain functionally safe data;
  to determine a first actual characteristic value for a safety-relevant characterizing attribute of the data processing and/or data transmission;
  to transmit the functionally safe data and the first actual characteristic value.

Alternatively or additionally, the safe hardware and/or software component is adapted
  to receive transmitted functionally safe data and a first actual characteristic value for a safety-relevant characterizing attribute of the data processing and/or data transmission;
  to determine a second actual characteristic value for the safety-relevant characterizing attribute;
  to process the first actual characteristic value and the second actual characteristic value to obtain a third actual characteristic value for the safety-relevant characterizing attribute;
  to determine a nominal characteristic value for the safety-relevant characterizing attribute;
  to compare the third actual characteristic value with the nominal characteristic value of the safety-relevant characterizing attribute; and
  depending on the comparison result:
    to further process and/or forward the functionally safe data if the result of the comparison is positive; or
    to trigger a predetermined safety reaction if the result of the comparison is negative.

Particularly preferably, the device is configured as a safe input module, a safe output module, a safe PLC module, a safe logic module, or a safe coupling module.

Thus, according to the invention, each subsystem module providing a partial safety function advantageously transmits not only the functionally safe data (e.g. "emergency stop actuated"), but also supplements them with further information in the form of actual characteristic values such as, e.g., set filter time, quality of the signal, internal processing time, transfer time, quality of transmission, the own percentage of SIL, for safety-relevant characterizing attributes such as, e.g., the SIL percentage left, the age or actuality of the signal or of the data, or the total response time, and this additional information is received by a downstream subsystem module in the safety chain, which provides a partial safety function, and is processed there and evaluated or compared with nominal characteristic values, for example, for whether or not the data is already too old or too much of the SIL has already been consumed.

This is also a significant difference of the invention over the aforementioned DE 10 2015 103 740 which only suggests that a subsystem module transmits its own SIL characteristic value together with functionally safe data to a downstream subsystem module which compares the received SIL characteristic value with its own SIL characteristic value and forwards the functionally safe data together with the lower SIL characteristic value. According to the invention, by contrast, it is contemplated that a subsystem module which receives, together with functionally safe data, an actual characteristic value for a safety-relevant characterizing attribute of the data transmission and/or data processing, processes or recalculates the received actual characteristic value together with a further actual characteristic value which is determined by the receiving subsystem module itself, and then compares the calculated actual characteristic value with a nominal characteristic value and, depending on the result of the comparison, triggers a safety reaction such as shutdown of a channel or of a module, or performs further processing and/or forwarding using the received functionally safe data and the calculated actual characteristic value.

The present invention offers many advantages. Most importantly, it allows for easy monitoring of the safety chain in a modular safety system during ongoing operation, and this without need for additional hardware at a centralized location.

Hence, the invention significantly contributes to a flexibilisation of modular safety systems, since it is no longer necessary to recalculate in advance every new or modified configuration in terms of safety. Here, the invention ensures that, for example, a modified configuration continues to adhere to the required safety-related characteristic values from the original risk assessment or safety validation of the machine or installation without the need for a renewed safety consideration. This simplifies planning, especially for modular machines or installations, for the machine manufacturer and for the operation in ongoing production.

Moreover, the monitoring according to the invention also continues to function in "static" safety systems, installations, or machines which have a "static" configuration of the overall safety function. In this case it offers the operator for instance the advantage that even a creeping deterioration of data processing and/or data transmission would be detected, and thus the quality and safety of data processing and data transmission will always remain within the required or parameterized limits.

A further advantage is that the method can be carried out cyclically, so that with every new communication or data transmission cycle, the data processing and data transmission within the safety chain can be monitored with respect to at least one, but preferably a plurality of safety-relevant characterizing attributes.

According to an advantageous embodiment of the invention, it is contemplated that, prior to the forwarding of the functionally safe data from the second subsystem module to a further one of the subsystem modules by the second subsystem module, a fourth actual characteristic value for the safety-relevant characterizing attribute is determined, and is processed together with the third actual characteristic value so as to obtain a fifth actual characteristic value for the safety-relevant characterizing attribute, and that this fifth actual characteristic value is provided as the first actual characteristic value, and that the functionally safe data and this first actual characteristic value are forwarded from this second subsystem module to the further subsystem module.

According to a preferred embodiment, the determining of the nominal characteristic value comprises reading out the nominal characteristic value from a memory.

According to a particularly preferred embodiment, the determining of at least one of the actual characteristic values comprises acquiring the actual characteristic value in a metrological manner or reading out the actual characteristic value from a memory.

In another embodiment of the invention, the transmitting comprises transmitting the functionally safe data and the first actual characteristic value together in a shared protocol-specific data area or separately from each other in separate protocol-specific data areas, and according to an underlying safe data transfer protocol. In this case, it is furthermore possible to integrate the invention into existing (safety) protocols, in particular in transparent manner. However, it is also possible to provide new (safety) protocols that implement the invention.

BRIEF DESCRIPTION OF THE DRAWINGS

These and further features and advantages of the present invention will become apparent from the exemplary embodiments which are described below with reference to the accompanying drawings, wherein.

DETAILED DESCRIPTION

Figure 1:
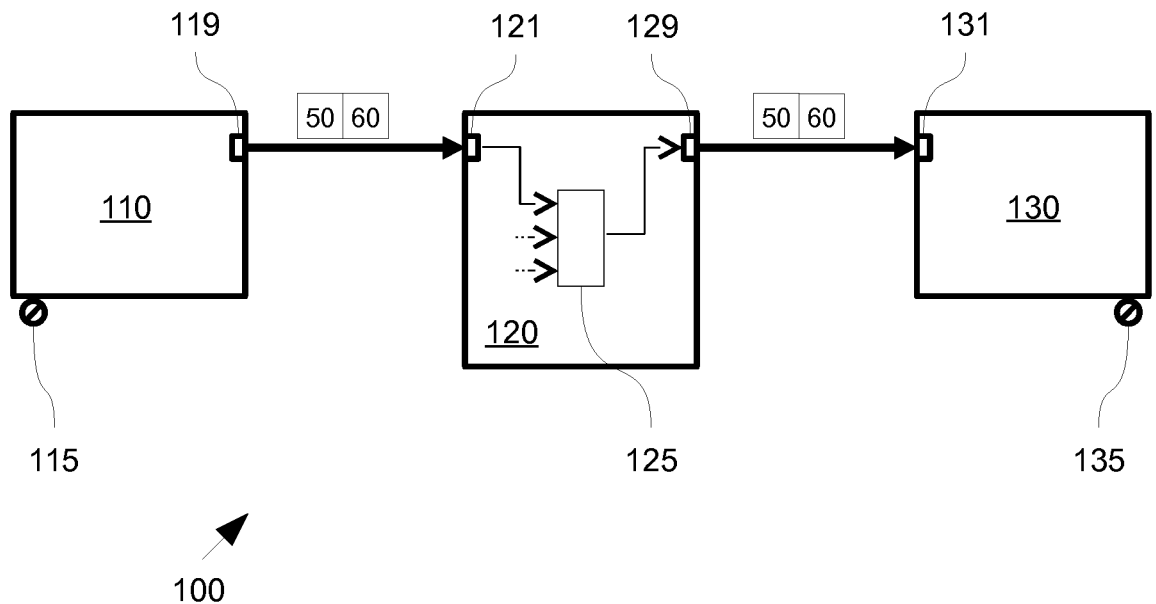
FIG. 1 is a schematic diagram of a modular safety system in the form of a machine comprising three subsystem modules.

FIG. 1 shows a schematic diagram of a modular safety system 100 in the form of a machine comprising three subsystem modules 110, 120, and 130, each one providing a partial safety function, which together form the overall safety function 'emergency stop of the machine'. Subsystem module 110 is configured as a safe input module, subsystem module 120 as a safe logic module, and subsystem module 130 as a safe output module, each one is connected to a data transfer channel, not illustrated, for example to a fieldbus or to respective internal interconnected backplane buses, and furthermore they are able to communicate with each other. Furthermore, these three subsystem modules are configured for functionally safe data processing and data transmission. For this purpose, they comprise safe hardware and/or software components 115, 119, 121, 125, 129, 131, and 135. These preferably include safe data transmission components 119 and 129, safe data reception components 121 and 131, a safe input component 115 in the form of an input terminal, a safe logic component 125, and a safe output component 135 in the form of an output terminal. It should be noted here that each of the subsystem modules may include both a data transmission and a data reception component, so that bidirectional data transfer is possible. For the sake of clarity, however, not all of these components are illustrated in the figure.

The safety chain here begins at the input terminal at safe input module 110 and terminates at the output terminal at safe output module 130. However, a sensor such as in the form of an emergency stop button at input terminal 115, and an actuator such as in the form of a contactor at the output terminal 135 are not considered to be a part of the safety chain here, and are not shown. The monitoring of the data processing and data transmission in the safety chain according to the invention, which will now be explained in more detail, accordingly extends from input component 115 to output component 135 in the case of FIG. 1.

All involved subsystem modules 110, 120, and 130 are aware of the percentage of the SIL they "consume", of the safety system 100, and of their own internal processing time. The safe logic module 120 and the safe output module 130 are additionally aware of the cycle time of the data transfer channel. The SIL percentage left and the age of the signal or of the data are safety-relevant characterizing attributes for which associated characteristic values 60 are determined, transmitted, processed, and evaluated or compared, for monitoring the data processing and data transmission in the safety chain of the modular safety system 100.

Safe input module 110 acquires and processes the status or level of the input component 115 using a firmware component, not illustrated, and generates functionally safe data 50 from this input value.

In addition, the safe input module, determines two first actual characteristic values 60 for the safety-relevant characterizing attributes 'SIL percentage left' and 'age of the data', for example also by using its firmware component. The safe input module 110 reads out its own SIL percentage of −1% and the filter time of 10 ms from a memory component which is not illustrated in the figure, while it acquires its own processing time of 4 ms in a metrological manner. Safe input module 110 accordingly determines 100%−1%=99% as an actual characteristic value for the SIL percentage left (corresponding to the SIL percentage left after the processing in the subsystem module), and 10 ms+4 ms=14 ms as the age of the data (corresponding to the delay within the subsystem module). These two first actual characteristic values 60 and the functionally safe data 50 are transmitted by the safe input module 110 to the next subsystem module 120, via its data transmission component 119. This data transmission is represented in the figure by the arrow between subsystem modules 110 and 120.

Subsystem module 120, i.e. the safe logic module in FIG. 1, receives the transmitted data set comprising functionally safe data 50 and the additional first actual characteristic values 60, via its data reception component 121.

In addition, the safe logic module 120 determines two second actual characteristic values for the safety-relevant characterizing attributes 'SIL percentage left' and 'age of the data', using its logic component 125. Safe logic module 120 reads out the SIL percentage of −1% of the data transfer channel from a memory component, not illustrated in the figure, while the transmission time or bus cycle time of 20 ms is acquired in a metrological manner. The safe logic module 120 then processes the received first actual characteristic values 60 together with the determined second actual characteristic values so as to obtain two third actual characteristic values, thereby determining 99%−1%=98% as the actual characteristic value for the 'SIL percentage left', and 14 ms+20 ms=34 ms as the 'age of the data'. Using its logic component 125, the safe logic module 120 compares these two third actual characteristic values with two nominal characteristic values read out from a memory component, not shown, which were parameterized for the safety-relevant characterizing attributes 'SIL percentage left' and 'age of the data'. If for at least one of the safety-relevant characterizing attributes, the third actual characteristic value deviates from the associated nominal characteristic value or at least deviates by more than a parameterized threshold value, a predefined safety reaction is triggered. That means, if the result of the comparison is negative, the transmitted data 50 will not be further processed, for instance because they are too old, e.g. due to a communication disruption. Preferably, an error message is then generated for the operator of the safety system 100.

If the comparison result is positive, i.e. if there is no deviation from the associated nominal characteristic value or at most a deviation smaller than the parameterized threshold value, the transmitted functionally safe data 50 can be further processed by the safe logic module 120 using the logic component 125 thereof, and can then be provided for being forwarded.

In addition, the safe logic module 120 determines two fourth actual characteristic values for the safety-relevant characterizing attributes 'SIL percentage left' and 'age of the data'. It reads out its own SIL percentage of −1% from a memory component, not illustrated in the figure, while capturing its own processing time of 3 ms in a metrological manner. The safe logic module 120 then processes the third actual characteristic values together with the determined fourth actual characteristic values so as to obtain two fifth actual characteristic values, thereby determining 98%−1%=97% as the actual characteristic value for the 'SIL percentage left', and 34 ms+3 ms=37 ms as the 'age of the data'. It then makes available these two fifth actual characteristic values for being forwarded like two first actual characteristic values 60. Via its data transmission component 129, the safe logic module 120 transmits the two first actual characteristic values 60 and the functionally safe data 50 to the next subsystem module 130. This data transmission is illustrated in the figure by the arrow between subsystem modules 120 and 130.

Subsystem module 130, i.e. the safe output module, receives the transmitted data set including functionally safe data 50 and the additional first actual characteristic values 60 via its data reception component 131.

In addition, the safe output module determines two second actual characteristic values for the safety-relevant characterizing attributes 'SIL percentage left' and 'age of the data', e.g. using its firmware component, not illustrated. Safe output module 130 reads out the SIL percentage of the data transfer channel of −1% from a memory component, not illustrated in the figure, while capturing the transfer time or bus cycle time of 15 ms in a metrological manner. Safe output module 130 then processes the received first actual characteristic values 60 together with the determined second actual characteristic values so as to obtain two third actual characteristic values, thereby determining 97%−1%=96% as the actual characteristic value for the 'SIL percentage left', and 37 ms+15 ms=52 ms as the 'age of the data'. For example by using its firmware component, the safe output module 130 compares these two third actual characteristic values with two nominal characteristic values read out from a memory component, not shown, which were parameterized for the safety-relevant characterizing attributes 'SIL percentage left' and 'age of the data'. If for at least one of the safety-relevant characterizing attributes, the third actual characteristic value deviates from the associated nominal characteristic value or at least deviates by more than a parameterized threshold value, a predefined safety reaction is triggered. That means, if the result of the comparison is negative, the transmitted data 50 will not be further processed.

If the comparison result is positive, i.e. if the age of the signal and the SIL percentage left are within the parameterized limits, the transmitted functionally safe data 50 can be further processed by the safe output module 130 using the firmware component thereof to obtain an output signal which can then be output at output terminal 135.

By virtue of the invention it is now be possible, for example, to replace the subsystem module 110 by a new or other subsystem module without compromising the safety of the safety system 100 by this changed configuration and without requiring new safety considerations. For example, should the new subsystem module 110 'consume' a greater SIL percentage or have a longer filter time or processing time than the replaced subsystem module, the subsystem module 120 or 130 would trigger a safety reaction, if the parameterized nominal characteristic values for the safety-relevant characterizing attributes 'SIL percentage left' and 'age of the data' are no longer adhered to. This substantial advantage would also apply if an additional subsystem module should be integrated, such as a coupling module configured as a gateway.

In a modification of the example of FIG. 1, not illustrated, it may as well be contemplated that a subsystem module such as the safe logic module, although performing the processing or recalculating of received and determined actual characteristic values, does not perform a comparison with nominal characteristic values. In this case, only the calculated actual characteristic value and the functionally safe data are transmitted to the next subsystem module.

Figure 2:
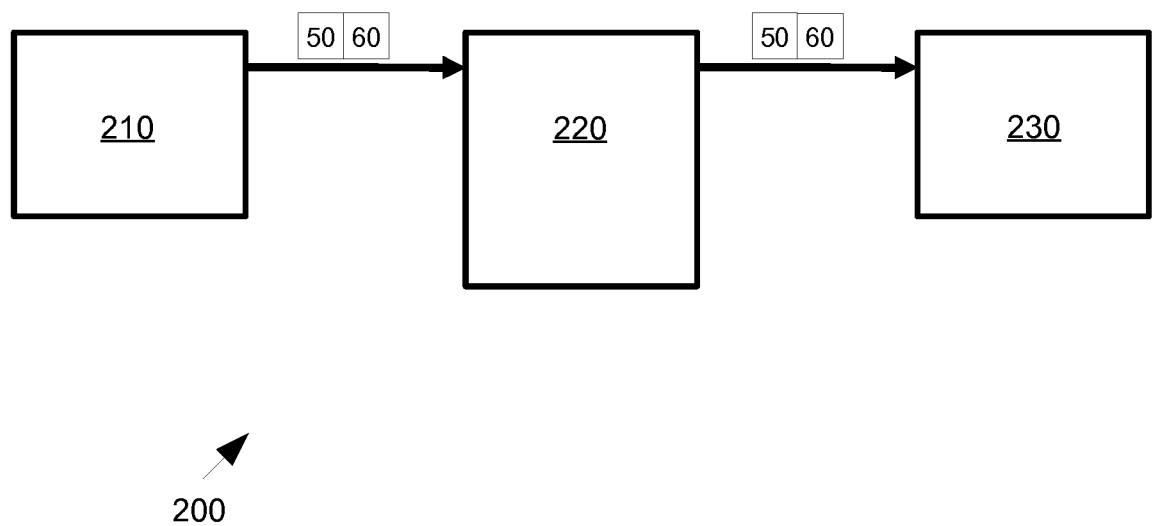
FIG. 2 is a schematic diagram of a modular safety system comprising three subsystem modules in the form of three machines.

FIG. 2 shows a schematic diagram of a modular safety system 200 comprising three subsystem modules 210, 220, and 230 in the form of three machines. This safety system 200 provides, for example, a "stop-all-machines emergency stop" as an overall safety function. The machines 210, 220, and 230 are each connected to a data transfer channel, not shown, and are able to communicate with each other via this channel. For the sake of simplicity, again, only one direction of communication is illustrated by the arrows between machines 210 and 220 as well as between 220 and 230. Of course, however, the method works also bidirectionally. The overall safety function "stop-all-machines emergency stop" means that when a safety request is triggered in machine 210, it must also be effective for machine 230.

The functionally safe processing and transmission of data within the safety chain that extends from machine 210 to machine 230 and the monitoring thereof works similarly to the exemplary embodiment described above and illustrated in FIG. 1. In the example of FIG. 2, machine 210 or 220 also transmits functionally safe data 50 and additionally at least one first actual characteristic value 60 for a safety-relevant characterizing attribute of the data processing and/or data transmission to machine 220 or 230, respectively. It will be understood that in this case the actual and nominal characteristic values for the safety-relevant characterizing attributes 'SIL percentage left' and 'age of the data' may be different from the characteristic values mentioned in the first exemplary embodiment. Alternatively or additionally, other safety-relevant characterizing attributes can also be determined.

LIST OF REFERENCE NUMERALS

50 Functionally safe data
60 Actual characteristic value(s)
100 Safety system
110 Subsystem module, safe input module
115 Input component, input terminal
119 Data transmission component
120 Subsystem module, safe logic module
121 Data reception component
125 Logic component
129 Data transmission component
130 Subsystem module, safe output module
131 Data reception component
135 Output component, output terminal
200 Safety system
210 Subsystem module, machine
220 Subsystem module, machine
230 Subsystem module, machine

The invention claimed is:

1. A method for monitoring data processing and data transmission in a safety chain of a safety system, wherein the safety system provides an overall safety function and is composed, in a modular manner, of at least two subsystem modules, and wherein at least the two subsystem modules are connected to a data transfer channel and each provide a partial safety function and are configured for functionally safe data processing and/or data transmission, comprising the steps of:

processing data by a first one of the subsystem modules to obtain functionally safe data;
determining, by said first subsystem module, a first actual characteristic value for a safety-relevant characterizing attribute of the data processing and/or data transmission, in particular for a total response time;
transmitting the functionally safe data and the first actual characteristic value from said first subsystem module to a second one of the subsystem modules, and receiving the functionally safe data and the first actual characteristic value by said second subsystem module;
determining, by said second subsystem module, a second actual characteristic value for the safety-relevant characterizing attribute;
processing the first actual characteristic value and the second actual characteristic value so as to obtain a third actual characteristic value for the safety-relevant characterizing attribute, by said second subsystem module;
determining, by said second subsystem module, a nominal characteristic value for the safety-relevant characterizing attribute;
comparing said third actual characteristic value with the nominal characteristic value of the safety-relevant characterizing attribute, by said second subsystem module, and, depending on the comparison result,
if the result of the comparison is positive, further processing and/or forwarding the functionally safe data; or
if the result of the comparison is negative, triggering a predefined safety reaction.

2. The method of claim 1,
wherein the data processing and data transmission in the safety chain of the safety system is performed cyclically; and
wherein the steps of the method are performed cyclically.

3. The method of claim 1,
wherein prior to the forwarding of the functionally safe data from the second subsystem module to a further one of the subsystem modules by the second subsystem module, a fourth actual characteristic value for the safety-relevant characterizing attributes is determined, and is processed together with the third actual characteristic value so as to obtain a fifth actual characteristic value for the safety-relevant characterizing attribute;
wherein said fifth actual characteristic value is provided as the first actual characteristic value; and
wherein the functionally safe data and said first actual characteristic value are forwarded from said second subsystem module to said further subsystem module.

4. The method of claim 1, wherein the determining of the nominal characteristic value comprises reading out the nominal characteristic value from a memory.

5. The method of claim 1, wherein the determining of at least one of the actual characteristic values comprises acquiring the actual characteristic value in a metrological manner or reading out the actual characteristic value from a memory.

6. The method of claim 1, wherein the transmitting comprises transmitting the functionally safe data and the first actual characteristic value together in a shared protocol-specific data area or separately from each other in separate protocol-specific data areas, and according to an underlying safe data transfer protocol.

7. A device for carrying out the method of claim 1, comprising a safe hardware and/or software component configured for functionally safe data processing and/or data transmission,
   wherein said safe hardware and/or software component is adapted
      to process data to obtain functionally safe data; to determine a first actual characteristic value for a safety-relevant characterizing attribute of the data processing and/or data transmission;
      to transmit the functionally safe data and the first actual characteristic value; and wherein said safe hardware and/or software component is adapted
   to receive transmitted functionally safe data and a first actual characteristic value for a safety-relevant characterizing attribute of the data processing and/or data transmission;
      to determine a second actual characteristic value for the safety-relevant characterizing attribute;
      to process the first actual characteristic value and the second actual characteristic value to obtain a third actual characteristic value for the safety-relevant characterizing attribute;
      to determine a nominal characteristic value for the safety-relevant characterizing attribute;
      to compare the third actual characteristic value with the nominal characteristic value of the safety-relevant characterizing attribute; and
   depending on the comparison result:
      to further process and/or forward the functionally safe data if the result of the comparison is positive; or
      to trigger a predetermined safety reaction if the result of the comparison is negative.

8. The device of claim 7, wherein the device is configured as a safe input module, a safe output module, a safe PLC module, a safe logic module, or a safe coupling module.

* * * * *